C. P. HEIDE.
MEASURING DEVICE.
APPLICATION FILED JULY 5, 1910.
1,027,418.
Patented May 28, 1912.
2 SHEETS—SHEET 1.
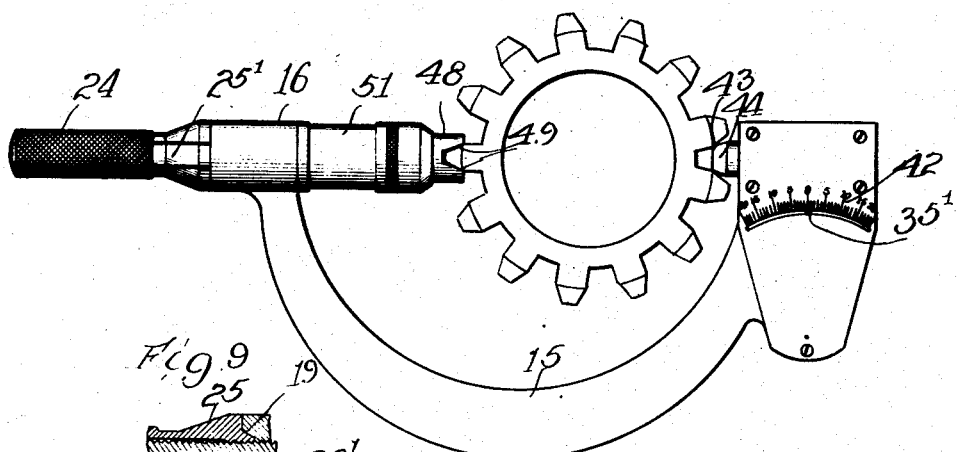
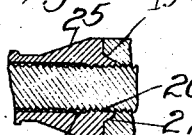
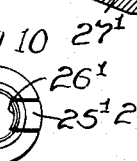
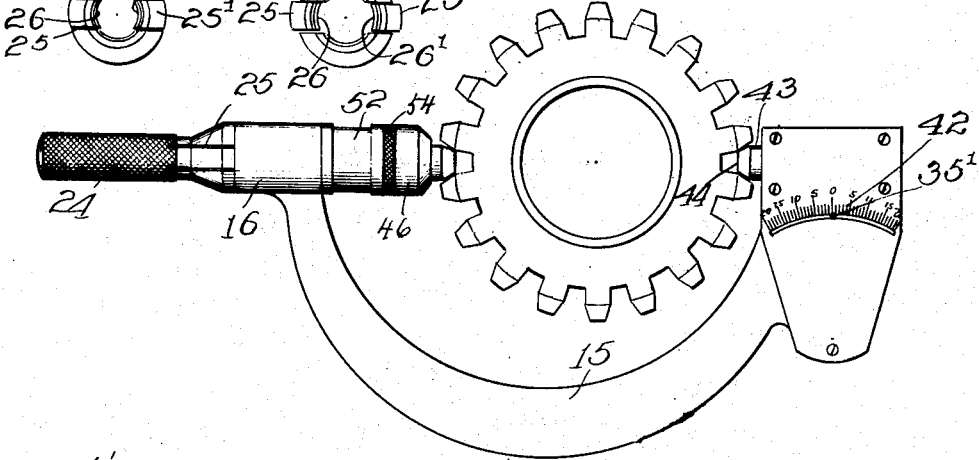
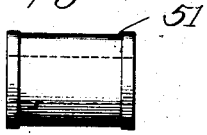
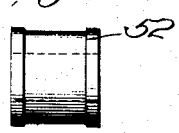

C. P. HEIDE.
MEASURING DEVICE.
APPLICATION FILED JULY 5, 1910.
1,027,418.
Patented May 28, 1912.
2 SHEETS—SHEET 2.
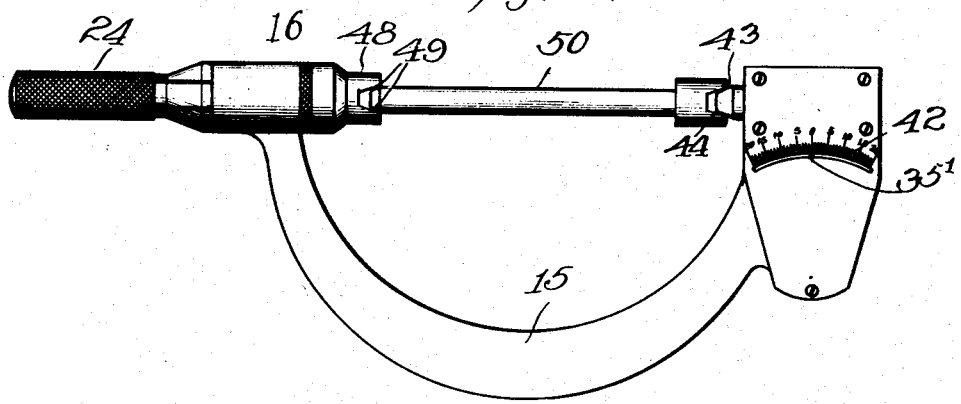
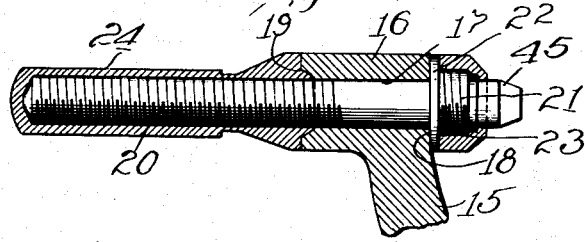
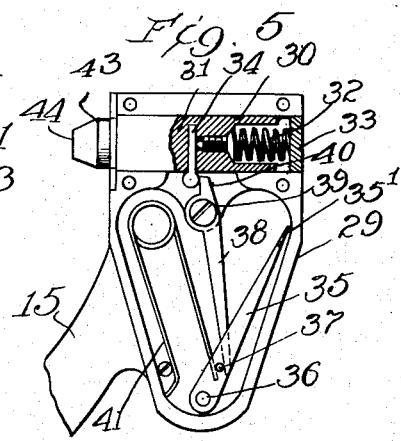
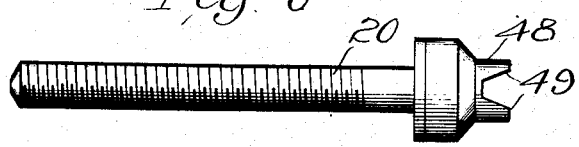
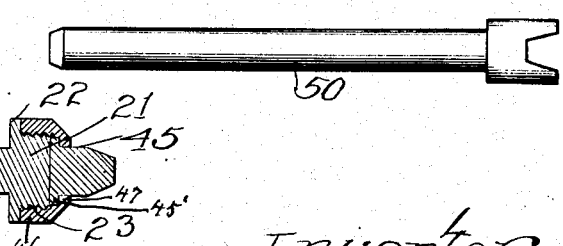

UNITED STATES PATENT OFFICE.

CHRISTEN P. HEIDE, OF KENOSHA, WISCONSIN.

MEASURING DEVICE.

1,027,418.  Specification of Letters Patent.  Patented May 28, 1912.

Application filed July 5, 1910. Serial No. 570,255.

*To all whom it may concern:*

Be it known that I, CHRISTEN P. HEIDE, a citizen of the United States, residing at Kenosha, in the county of Kenosha and State of Wisconsin, have invented certain new and useful Improvements in Measuring Devices, of which the following is a specification.

My invention relates to improvements in measuring devices, and more particularly to gages for measuring the pitch diameter of gear wheels.

One of the objects of my invention is to provide a more efficient, convenient, and accurate means for measuring gear wheels.

Another object of my invention is to provide a gage whereby the diameter of a gear wheel, on the pitch line, may be determined regardless of the total outside diameter of the wheel. And still another object of my invention is to provide a device that may be permanently calibrated or set for a given size and which will automatically indicate the correct set measurement or the degree of variation therefrom.

Other and further objects of my invention will readily become apparent to persons skilled in the art from a consideration of the specification taken in conjunction with the drawings, wherein—

Figure 1 is a side elevation showing the gage applied to a gear wheel having an odd number of teeth; Fig. 2 is a similar view showing the gage applied to a larger gear having an even number of teeth; Fig. 3 is a side elevation showing the gage and a standardizing or calibrating bar for the gage when the gage is set for measuring a gear wheel having an odd number of teeth; Fig. 4 is an enlarged section of one end of the gage frame or yoke; Fig. 5 is a similar view of the opposite end of the frame or yoke; Fig. 6 is a detail of the screw-threaded stem with an anvil used for a gear with an odd number of teeth, attached; Fig. 7 is a view of said stem, with an anvil used for a gear having an even number of teeth, attached; Fig. 8 is an enlarged view of the standardizing bar shown in Fig. 3; Fig. 9 is a broken-away longitudinal central section of the slip nut structure; Fig. 10 is an end view of the said nut closed; Fig. 11 is a similar view showing the nut opened; and Figs. 12, 13 and 14 are distance collars.

In all of the views, the same reference characters indicate similar parts.

As is well known, the pitch line of a gear wheel is the circle upon which the "pitch" of the tooth is measured; and it is the circumference by which the diameter of the wheel is measured. The distance between the pitch line on one side of the wheel and the same line on the opposite side of the wheel is called the "pitch diameter." The distance from the face of one tooth to the corresponding face of the adjacent tooth, measured on an arc of the pitch circle, is called the "pitch of the tooth" or "circular pitch." The pitch of the tooth comprises the width of the tooth and the space between the tooth and adjacent tooth.

In order that gearing should operate noiselessly and efficiently, it is very essential that the accurate pitch diameter shall be preserved. The total diameter of the wheel is not so much of importance, as the addendum or dedendum of the tooth may be longer or shorter, within a limit as may be desired without materially affecting the operation of the gear, provided the pitch diameter remains constant, as it is on the circular pitch line that the velocity and relative velocity of the gearing is calculated.

My device is especially designed for the purpose of measuring and accurately ascertaining the pitch diameter of a gear wheel of a given total size or of a given number of teeth. It is also capable of readily indicating the degree of any variation from the desired or intended pitch diameter.

In Fig. 1, I have shown the instrument applied to a gear wheel having an odd number of teeth. It will be observed that the index points to zero, thereby indicating that there is no deviation from the true desired diameter of the gear on the pitch line.

The gage for determining the pitch diameter of the gear consists of a frame or yoke, 15, provided at one end with a head, 16, which is smoothly bored, as at 17, having a face, as at 18, the opposite end of which is taperingly counterbored, as at 19, a screw-threaded stem 20 passing freely through the bore 17, and containing on one end a head, 21, having a shoulder 22 and screw-threaded, as at 23. A spring slip-nut, 24, passes freely over the screw-threaded end of the stem 20, and is adapted to make engagement with the tapered end of the head, 16. The nut is split some distance, longitudinally, to form outwardly set, yielding, and elastic screw-threaded members or jaws, 25—25', which are threaded on their respective inner curved surfaces, as at 26—26'. The end of the nut, 24, including the jaws, is tapered, as at 27, for engagement with the tapered surface 19 on the head 16. When the jaws 25—25' are pressed inwardly, as shown in Figs. 9 and 10, they make threaded engagement with the threaded stem 20 and a slight turn of the nut 24 tightens the head or shoulder 22 of the stem 20 against the end surface 18 of the head, thereby to hold the stem in positive and fixed contact and invariable relation with the head 16. The slight turn of the nut 24 to the left disengages the tapered jaws from the tapered head 16 and the jaws, being resilient and tending to move outwardly, leave their engagement with the threads of the stem so that the nut 24 may be then freely longitudinally and quickly moved from its position surrounding the stem 20 without the necessity of rotating it sufficient to move it the full length of the stem and thus a slit nut is provided that may quickly and conveniently and positively be associated with the parts and as quickly removed when the necessity requires. To the other end of the frame 15 is secured a housing 29 which is bored at the end in axial alinement with the bore of the head 16. In the bore 30 of the head 29 is a yieldingly movable rod or stem, 31, which is yieldingly held in an outward position by a spring 32, having an abutment against the rear wall, 33, of the housing 29. Projecting laterally from the stem 31 is a round-headed pin, 34, which may be used to limit the longitudinal movement of the stem 31, and for the further purpose of indirectly moving the indicator hand, or index, 35. The indicating hand, 35, is pivoted, as at 36, and is provided with a pin 37 against which a lever, 38, is caused to press. The lever 38 is pivoted, as at 39, and has a forwardly projecting nose 40, which normally presses against the rounded portion of the pin, 34. A spring, 41, one end of which makes contact with the pin 37, normally maintains the indicating lever 35 in the position shown in Fig. 5. When the stem 31 is longitudinally moved against the resistance of the spring 32, the pin 34 moves the lever 38 against the resiliently resisting action of the spring 41 and thereby the indicating lever or index 35 is moved over the scale 42. The forward end of the stem 31 is tapered as at 43, the distance between the opposite front sides at its end face, as at 44, must be equal to the distance between adjacent teeth on the pitch line of the gear to be measured, which is about one-half of the true tooth pitch. The taper 43 is at a sharper angle to the axis of the stem 31 than the taper of adjacent teeth from the pitch line to the end of the addendum of the tooth, so that the face portion 44 is just sufficient to bridge the space between adjacent teeth on the diametrical pitch line. The relation of the taper of the anvil and the tooth is clearly shown in Figs. 1 and 2.

An insertible anvil, 45, similar to the anvil shown in Fig. 5, may be detachably secured to the stem 20. An advantageous construction of such detachable anvil is shown involving a flange 45' upon the anvil, and a collar 46 having internal screw-threads for coaction with the threaded portion 23 of the stem 20, and a shoulder 47 for coaction with the flange 45' of the anvil, as shown in Fig. 7. This makes for quick adjustment of the device for different sized gears by the use of spacing collars to be described.

By observing Fig. 2 it will be seen that the gear, to which the gage is applied, is provided with an even number of teeth, and that two like pointed tapering anvils are used, that is to say, anvils that bridge the spaces between adjacent teeth on the pitch line. It will be further observed that the index 35' is pointing to zero, from which fact the operator ascertains the true pitch diameter of the gear. If the diameter on the pitch line were smaller the anvils 43 and 45 would approach nearer together, the stem 31 being pressed by the spring, 32, so that the spring, 41, would move the hand or pointer 35 several degrees to the right of the zero mark indicating that the diameter is to that extent scant. If the gear were of larger diameter on the pitch line, the anvils 43 and 45 would not approach so closely together and the stem 31 would thereby be pressed farther into the housing, 29, against the resistance of the compression spring 32, and the pin 34 would move the lever 38 in such a direction that the indicating lever 35 or index 35' would be caused to move to the left of the zero several degrees, indicating excessive diameter of the gear on the pitch line, and thus it will be seen that the pitch diameter of the gear may be readily ascertained and the extent of variation visibly indicated. When a gear wheel having an odd number of teeth is to be measured, the anvil 48, which bridges one tooth, the ends of the diverging surface being equal to the width of the tooth on the pitch diameter, is used in place of the anvil 45, as clearly shown in Fig. 1.

Testing bars, 50 are used for the purpose of testing the gage from time to time, as shown in Fig. 3, that its true integrity may be preserved.

When the device is to be set for gears of different diameters, spacing collars, 51, 52, and 53, such as shown in Figs. 12, 13 and 14 of which there may be any desired number, are used in connection with the gage, each said spacing collar providing suitable threaded portions at its ends for engagement respectively with the threads 23 of stem 20 and with a joint member 54, which is provided with the usual exterior threads upon each side of the central knurled portion. Thus, the spacing collars and the joint member 54 constitute an extension means providing at each end threaded portions for engagement between the threaded portions of the stem 20 and the anvil 45, which latter normally are adapted to engage when no extension means is necessary. In Fig. 1, the longer collar is used for the smaller gear, in Fig. 2 a smaller collar is used with the larger gear, and in like manner collar 53 is intended for use with a still larger gear.

The device is especially intended for use to test each gear of a large number of intended similar diameter, and when it is to be used for gear wheels materially differing in diameter, a spacing collar, longer or shorter as the case may be, must be substituted for the one previously used. Each spacing collar may have its respective diametrical pitch impressed in its surface to indicate that it is to be used with the gage for indicating the corresponding pitch diameter.

While I have herein described in some detail a particular embodiment of my invention it will be apparent to persons skilled in the art that numerous changes might be made in the specific details of construction shown without departure from the spirit of the invention and within the scope of the appended claims.

What I claim is:

1. In a device of the character described, a yoke, a housing at one end of said yoke, an indicating hand pivoted in the bottom of said housing, an operating lever pivoted in the top of the housing, a pin extending from one side of the indicating hand above the pivot point thereof, said operating lever extending downwardly to engage said pin to move the indicating hand, a nose above the pivot point of the operating lever, a slidable anvil above said nose, a round-headed pin extending from one side of the anvil to engage said nose and move the operating lever and through it the indicating hand when the anvil is slid backwardly, a spring yieldingly holding the anvil in forwardmost position, and a spring yieldingly holding the indicating hand and through it the operating lever in forwardmost position.

2. In a gage for measuring the pitch diameter of gears, a yoke, suitably shaped anvils upon opposite ends of said yoke, one thereof being stationary and the other slidable toward and from said stationary anvil, means for indicating the extent of the sliding movement of said slidable anvil, said anvil providing in its rear end a central bore, a spring in said bore normally maintaining said anvil in position nearest said stationary anvil, a pin projecting laterally from the anvil, a set screw in said central bore for maintaining said pin in position, and means associated with said pin for operating said indicating means.

In testimony whereof I hereunto set my hand in the presence of two witnesses.

CHRISTEN P. HEIDE.

In the presence of—
  FREDERICK PURDIE,
  M. P. WINTHER.